United States Patent
Wakelin et al.

(10) Patent No.: US 11,178,222 B1
(45) Date of Patent: Nov. 16, 2021

(54) CONTROLLING A SERVER RESPONSE LATENCY

(71) Applicant: INTERNATIONAL BUSINESS MACHINES CORPORATION, Armonk, NY (US)

(72) Inventors: Philip Ivor Wakelin, Eastleigh (GB); Michael D. Brooks, Southampton (GB); Julian Charles Horn, Eastleigh (GB); Alan Hollingshead, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/860,611

(22) Filed: Apr. 28, 2020

(51) Int. Cl.
| | |
|---|---|
| *H04W 4/021* | (2018.01) |
| *H04W 4/02* | (2018.01) |
| *H04L 29/08* | (2006.01) |
| *H04L 29/06* | (2006.01) |
| *H04L 12/58* | (2006.01) |

(52) U.S. Cl.
CPC .......... *H04L 67/1034* (2013.01); *H04L 67/02* (2013.01); *H04L 67/42* (2013.01)

(58) Field of Classification Search
USPC ................................. 709/203, 235, 237, 232
See application file for complete search history.

(56) References Cited

U.S. PATENT DOCUMENTS

| | | | | |
|---|---|---|---|---|
| 5,941,951 A * | 8/1999 | Day | ................. | H04N 21/23805 709/233 |
| 6,014,707 A * | 1/2000 | Miller | ..................... | H04L 29/06 370/252 |
| 6,418,474 B1 * | 7/2002 | Morris | ..................... | H04L 29/06 709/224 |
| 8,516,146 B1 * | 8/2013 | Yen | ......................... | H04L 69/329 709/235 |
| 9,042,888 B2 * | 5/2015 | Juang | ..................... | H04W 48/18 455/435.2 |
| 9,733,983 B2 | 8/2017 | Kukreja et al. | | |
| 10,218,805 B2 | 2/2019 | Knecht et al. | | |
| 10,270,794 B1 | 4/2019 | Mukerji et al. | | |
| 10,320,680 B1 | 6/2019 | Mehr | | |
| 10,872,152 B1 * | 12/2020 | Martel | ..................... | G06F 21/31 |
| 2002/0173857 A1 * | 11/2002 | Pabari | ..................... | H04L 67/22 700/1 |
| 2010/0306055 A1 * | 12/2010 | Kolb | ....................... | G06Q 30/02 705/14.55 |
| 2011/0242990 A1 * | 10/2011 | Simonsson | ......... | H04W 72/085 370/242 |
| 2018/0091404 A1 * | 3/2018 | Galkin | .................... | H04L 67/42 |
| 2018/0288564 A1 * | 10/2018 | Ellis | ...................... | H04W 4/021 |

OTHER PUBLICATIONS

An Integrated Multi-layer Approach for Seamless Soft Handoff in Mobile Ad Hoc Networks, Hui Zeng, Jason H. Li , Subir Das, Anthony McAuley, John Lee , Thomas Stuhrmann , and Mario Gerla. Journal of Communications, vol. 6, No. 1, Feb. 2011 (Year: 2011).*

* cited by examiner

*Primary Examiner* — Jude Jean Gilles
(74) *Attorney, Agent, or Firm* — Teddi E. Maranzano

(57) ABSTRACT

Controlling a server latency response is presented. One example comprises monitoring, at a server, a number of requests from a client that cause a failure response. The method then comprises, responsive to the number of requests meeting a predetermined requirement, delaying processing of the requests from the client by a predetermined delay time.

16 Claims, 5 Drawing Sheets

CONTROLLING A SERVER RESPONSE LATENCY

BACKGROUND

The present invention relates generally to server response times, and more particularly to controlling a server response latency.

The present invention also relates to a computer program product comprising computer-readable program code that enables a processor of a system, or a number of processors of a network, to implement such a method.

The present invention further relates to a computer system comprising at least one processor and such a computer program product, wherein the at least one processor is adapted to execute the computer-readable program code of said computer program product.

The present invention also relates to a system for controlling a server response latency.

A traditional web application server is a software framework that provides both facilities to create web applications and a server environment to run the web applications in. A traditional web application server acts as a set of components accessible to a software developer through a standard application programming interface (API) defined for the platform itself. For traditional web applications, these components are usually performed in the same running environment as their web server(s), and their primary purpose is to support the construction of dynamic pages. However, many traditional application servers target much more than just web page generation: they implement services such as clustering, fail-over, and load-balancing, so that developers are enabled to focus on implementing the business logic. Traditional web applications are computer code which run atop application servers and are written in the language(s) that the application server supports and call the runtime libraries and components the application server offers.

In certain scenarios, a web application server may fail to execute a request. Examples of scenarios that result in such failure include a security authorization failure, an internal error as a result of the server or a related component not being fully initialized, or simply that a fundamental network identification for a resource connected to the web (i.e. a uniform resource locater (URL)) was incorrect. Failure to execute a request is typically much less intensive with respect to processing than the execution of a full request and associated application, which may also include a database query or associated outbound request.

The web application server may employ an application level load balancer or Transmission Control Protocol and Internet Protocol (TCP/IP) workload distribution software to act as a reverse proxy and distribute network or application traffic across a number of servers. These are used to increase capacity (i.e. concurrent users) and reliability of web applications. In response to a failure to execute a request, the balancer or workload distribution software may view the failing web application server as responding efficiently and at a lower cost as a result of the decrease in processing intensity. This may appear highly desirable in comparison to other servers in the cluster which are executing requests without failures. Consequently, the "failing" server may quickly become overwhelmed with additional work as a result of an increasing workload being directed to the failure route by the application level load balancer or workload distribution software.

A typical solution to the scenario described above is to shut down the "failing" server. However, only a relatively small number of requests may be failing and all traffic connected to the server will consequently be blocked, resulting in processing delays and overall inefficiency. Another solution is for a client to close the connection to the server once they have received a predetermined number of negative responses (i.e. response failures). This approach does not necessarily solve the problem, as new connections will still be routed to the server.

SUMMARY

The present invention seeks to provide a computer-implemented method for controlling a server response latency.

The present invention further seeks to provide a computer program product including computer program code for implementing a proposed method when executed by a processing unit.

The present invention also seeks to provide a processing system adapted to execute this computer program code.

The present invention also seeks to provide a system for controlling a server response latency.

According to an aspect of the present invention, there is provided a computer-implemented method. The method comprises monitoring, at a server, a number of requests from a client that cause a failure response. The method then comprises, responsive to the number of requests meeting a predetermined requirement, delaying processing of the requests from the client by a predetermined delay time.

According to yet another aspect of the invention, there is provided a system for controlling a server response latency. The system comprises a monitoring unit configured to, at a server, monitor a number of requests from a client that cause a failure response. The system further comprises a delaying unit configured to, responsive to the number of requests meeting a predetermined requirement, delay processing of the requests from the client by a predetermined delay time.

According to another aspect of the invention, there is provided a computer program product for controlling a server response latency. The computer program product comprises a computer readable storage medium having program instructions embodied therewith, the program instructions executable by a processing unit to cause the processing unit to perform a method according to a proposed embodiment.

According to another aspect of the invention, there is provided a processing system comprising at least one processor and the computer program product according to an embodiment. The at least one processor is adapted to execute the computer program code of said computer program product.

BRIEF DESCRIPTION OF THE DRAWINGS

Preferred embodiments of the present invention will now be described, by way of example only, with reference to the following drawings, in which.

DETAILED DESCRIPTION

Figure 1:
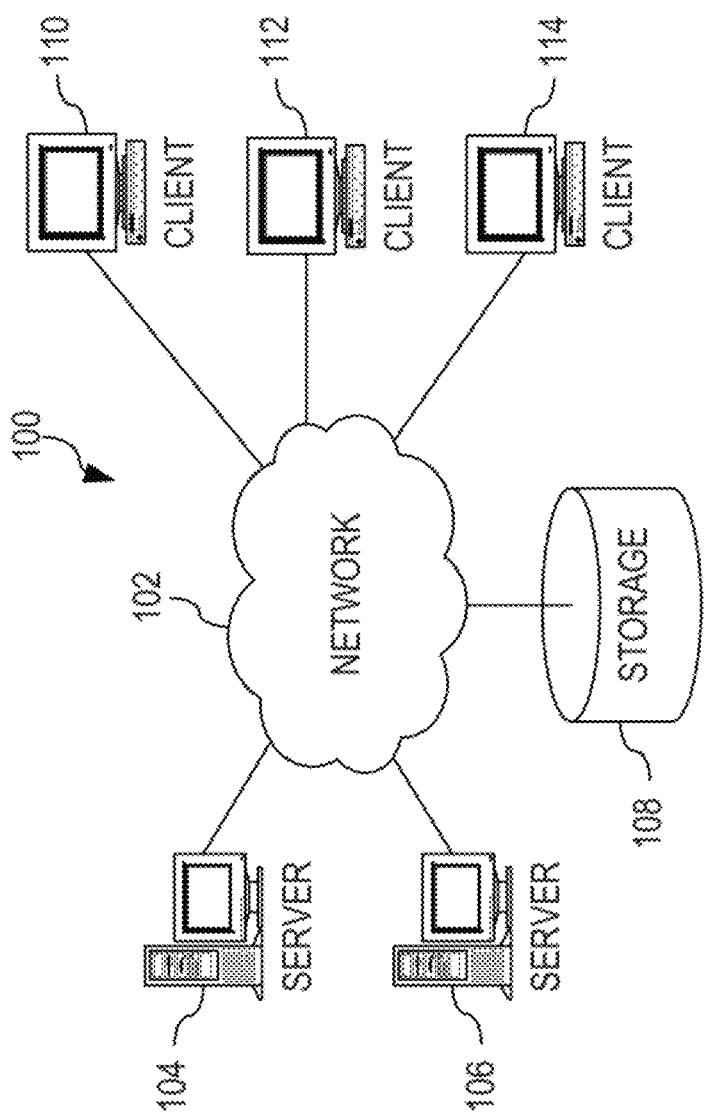
FIG. 1 depicts a pictorial representation of an example distributed system in which aspects of the illustrative embodiments may be implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Embodiments for controlling a server response latency are proposed. Such embodiments may enable increasing or decreasing a server response time as seen by a specified client so that the server may be seen by the specified client as being less productive than when functioning normally. Accordingly, embodiments may facilitate controlling a processing of requests from a client in response to a number of request from the client that cause a failure response.

Such embodiments may involve monitoring a number of requests received from each unique client, as identified by the network address associated with each of the requests and corresponding to the client. The number of requests that have resulted in a failure response may be noted for each client by way of an application server. Once a server has received a predefined number of consistent requests from a specific client that have resulted in a failure response, returning of all subsequent responses (whether failing or not failing) may be delayed by the server by suspending sending the response.

Embodiments may be implemented in conjunction with hardware and/or software that incorporates a fault reporting mechanism. In these embodiments, the server component may contain the logic for executing the proposed method and the client (or router) may not require any modifications in order to implement the proposed method.

Embodiments may further be implemented in conjunction with one or more server components. The one or more server components may comprise a server transport handler, request monitor controller (RMC), and a request flow controller (RFC). The server transport handler may be invoked after an incoming request is received. If a response is required, the server transport handler may invoke a reverse order before the response message is sent back to the calling client. The request monitor controller may handle the requests received from the server transport handler and may control the server response latency. The request flow controller may direct control between the server transport handler and request monitor controller with respect to the request processing and server response latency.

Embodiments may employ a concept of controlling the productivity of a server from the perspective of a specified client by controlling the server response time. In response to an increased server response time, the client may see the server as being less productive in comparison to its normal functioning. Consequently, existing hardware or software routers that use response time as a factor for determining the target destination of workloads may route work away from the particular server. As a result, the server may not become overloaded with failure requests (i.e. requests that cause a failure response) as its transaction throughput rate may decrease as response time increases. As such, the efficacy of other components on the server may be improved.

In an embodiment, monitoring, at the server, a number of requests from a client that cause a failure response may comprise processing the requests received from the client and identifying a number of the processed requests that result in a failure response. In this way, the processed requests that may result in a failure response time may be determined, such that the quantity of failure responses for a specific server may be appropriately tracked. This may enable issues relating to a specific server and its corresponding processing of requests to be identified, which may reduce the time taken to resolve any such issues.

In an embodiment, requests from the client that cause a failure response may comprise requests from the client that have a predefined error condition. In this way, requests from the client that cause a failure response may be more easily identified, which may increase the speed and efficiency in monitoring the number of requests from the client that cause a failure response.

In some embodiments, the predefined error condition may comprise at least one of a status code indicating a client error and a status code indicating a server error. In this way, failure responses resulting from errors originating from the client and the server may be monitored. This may increase the scope of requests that cause a failure response that can be identified, which may improve the efficiency and efficacy of monitoring the number of requests that cause a failure response.

In some embodiments, responsive to the number of requests meeting a predetermined requirement, delaying processing of the requests from the client by a predetermined delay time may comprise, in response to the number of requests being greater than or equal to a predetermined threshold, delaying processing of the requests from the client by the predetermined delay time. In this way, the processing of the requests from the client may be controlled in response to the number of requests that cause a failure response. The processing of the requests may be automatically delayed by the predetermined delay time in response to the number of requests being greater than or equal to a predetermined threshold. As a result, the response time of the server may increase from the perspective of the client, so that the server may appear to be less productive than when it is functioning normally. Consequently, routers that may use response time as a factor for determining the target destination for routing work may route further requests away from the failing server. This may reduce the workload placed on the failing server, which may mitigate the risk of further issues relating to other components on the server and may improve the efficacy of the web application servers.

In some embodiments, processing the requests received from the client may comprise receiving the requests from the client and identifying a property dataset associated with each of the requests. The step may further comprise identifying at least one of the client and a destination associated with the requests based on the identified property dataset. In this way, requests that cause a failure response may be monitored with respect to each individual client and/or destination of the request. As such, processing of the requests may be delayed by a predetermined delay time for a specified client and/or destination, instead of for all clients that use the server and/or all destinations. Consequently, only the client and/or the destination affected by the failure responses may experience the delay in processing the requests. This may improve the efficiency of controlling the server response latency.

In some embodiments, the property dataset may comprise at least one of an origin network address, a destination network address, a network cookie, a network header, and a host or network interface identifier. In this way, the scope of methods in which to identify the client and/or the destination associated with the request may be increased, which may improve the efficiency in identifying the client and/or the destination.

In some embodiments, delaying processing of the requests from the client by a predetermined delay time may comprise delaying processing of the requests from the client by a predetermined delay time and by a predetermined number of requests that result in a non-failure response. The requests that result in a non-failure response may comprise requests that do not have a predefined error condition. In this way, the processing of the requests may be delayed based on a predetermined delay time and a predetermined number of requests that result in a non-failure response. This may enable the delay to be automatically ended once a predetermined number of functioning requests (i.e. requests that do not result in a failure response) is processed. As a result, further methods of controlling the server response latency may be implemented, improving the overall control of the server response latency.

In a proposed embodiment, delaying processing of the requests from the client by a predetermined delay time may comprise identifying a response time for responding to the requests and assessing the identified response time against a predetermined response time. The step may further comprise, in response to the identified response time being greater than or equal to the predetermined response time, delaying processing of the requests from the client by the predetermined delay time. In this way, the server response latency may be controlled in response to the response time for responding to the requests. Consequently, requests that cause a failure response that already have a relatively long response time may not be further delayed. This may improve the efficiency of controlling the server response latency by mitigating the risk of unnecessary delaying of processing.

FIG. 1 depicts a pictorial representation of an exemplary distributed system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
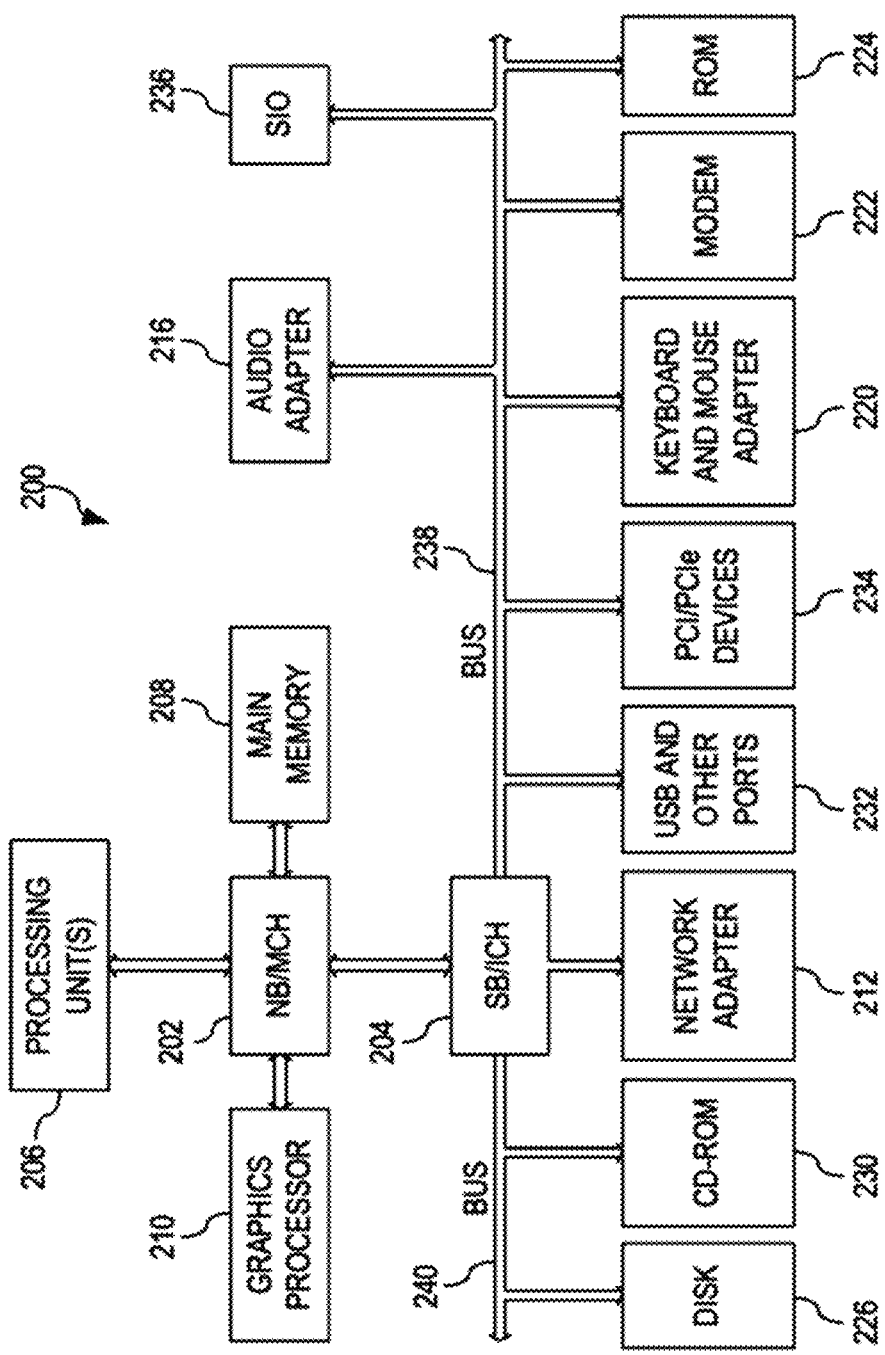
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located. For instance, the system 200 may be configured to implement an identifying unit, an associating unit, and a creating unit according to an embodiment.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, a computer system, running any operating system, such as the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD (disk) 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices HDD 226 and CD-ROM 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 3:
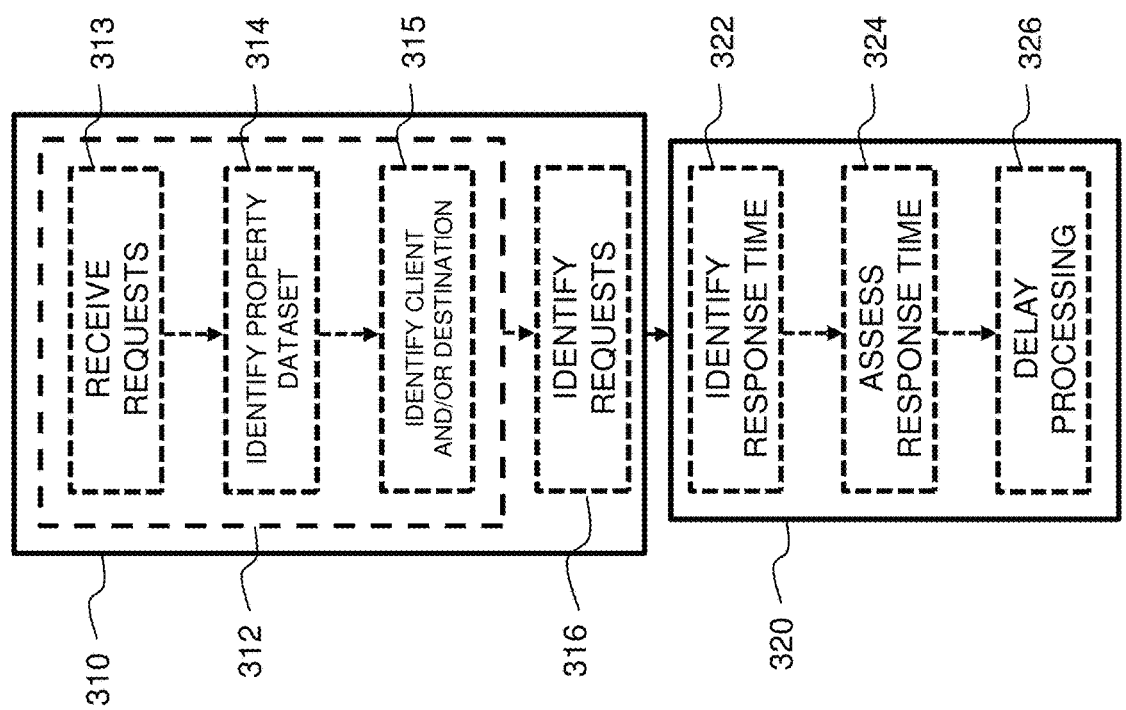
FIG. 3 is a flow diagram of a computer-implemented method for controlling a server response latency.

Referring now to FIG. 3, there is depicted a flow diagram of a computer-implemented method for controlling a server response latency.

Step 310 comprises monitoring, at a server, a number of requests from a client that cause a failure response.

In an embodiment, step 310 comprises steps 312 and 316. Step 312 comprises processing the requests received from the client. Step 316 comprises identifying a number of the processed requests that result in a failure response.

In an embodiment, step 312 comprises steps 313, 314, and 315. Step 313 comprises receiving the requests from the client. Step 314 comprises identifying a property dataset associated with each of the requests. Step 315 comprises identifying at least one of the client and a destination associated with the requests based on the identified property dataset. For example, a request is received by a sever transport handler and inspected by a request monitor controller (RMC) to determine information connected to one or more properties of the request, such as information relating to the origin and/or the destination of the request (i.e. a property dataset). If the property dataset does not yet exist, an entry is added to a data store of the request monitor controller, wherein the entry is to add a new point of origin for the identified client and/or a new point of destination of the request associated with the property dataset.

In an embodiment, the property dataset comprises at least one of an origin network address, a destination network address, a network cookie, a network header, and a host or network interface identifier. For example, the property dataset includes a client Internet Protocol (IP) address, cookies, Hypertext Transfer Protocol (HTTP) headers, and/or a Uniform Resource Locator (URL) address associated with the origin and/or destination of the request.

In an embodiment, requests from the client that cause a failure response comprise requests from the client that have a predefined error condition.

In an embodiment, the predefined error condition comprises at least one of a status code indicating a client error and a status code indicating a server error. In the example, the request is passed by way of the server transport handler to an application container for execution. The request is then executed by the application container and a corresponding response is built. The response is passed to the request monitor controller, where it is checked whether the any predefined error conditions have been returned (i.e. the response is a failure). For example, the predefined error condition is a Hypertext Transfer Protocol (HTTP) status code, such as HTTP status code 1xx (informational), 2xx (success), 3xx (redirection), 4xx (client error), 5xx (server error). For example, the predefined error condition is HTTP error code 50x (internal server error) or HTTP error code 404 (resource not found).

Step 320 comprises, responsive to the number of requests meeting a predetermined requirement, delaying processing of the requests from the client by a predetermined delay time.

In an embodiment, step 320 comprises, in response to the number of requests being greater than or equal to a predetermined threshold, delaying processing of the requests from the client by the predetermined delay time. In the example, if the request does not include any of the predefined error conditions, a "failed request count" metric is decremented by the request monitor controller for this point of origin in its data store (i.e. the property dataset associated with that request) and the request is returned to the server transport handler in the normal manner. If the request includes one or more predefined error conditions, the "failed request count" metric is incremented for the point of origin in its data stores (i.e. the property dataset associated with that request). Consequently, if the failed request count is greater than or equal to the predetermined threshold, the processing of the request is suspended by the request monitor controller for a specified period of time (i.e. a predetermined delay time) and the "failed request count" metric is decremented. By way of example, the predetermined delay time may be a preset time interval, such as one second. In another example, the predetermined delay time may be a minimum preset time interval, such as a minimum of one second. In another example, the predetermined delay time may comprise the elapsed processing time for the request. In an example, processing of the requests from the client is performed by cataloguing the destination of the request, rather than the identity of the client. Instead, delaying processing of the requests from the client is based on the host or network interface identifier (i.e. the URL address) and/or the destination network address associated with the requests (i.e. from the property dataset associated with the requests).

Once the predetermined delay time has ended, control of processing the requests is returned to the server transport handler (i.e. by way of a request flow controller). In another example, the predetermined threshold is a percentage threshold. For example, the delay process is triggered in response to 50% of the requests having been recorded as failing in a predetermined threshold interval. For example, the predetermined threshold interval may be a preset time interval, such as sixty seconds. In another example, the predetermined threshold interval may be based on a count of received requests. For example, the preset count of received requests may be one thousand requests, such that the delay process is triggered in response to five hundred of the requests having been recorded as failing. By way of further example, the predetermined threshold interval may be a variable time interval or count, instead of a fixed/preset time interval or count. For example, the varying time interval or count may be based on a rate of receiving requests (i.e. a request rate). In another example, the predetermined threshold interval comprises multiple factors, such as a preset time interval and/or a preset count of received requests. For example, the delay process is triggered in response to either 50% of the requests having been recorded as failing in a preset time interval (i.e. 60 seconds) or 50% of the requests having been recorded as failing in a preset count of received requests (i.e. 1000 requests). This is beneficial in a scenario where the request rate is less than 1000 requests per minute. In an example, the percentage threshold is between 10% and 100%. For example, the percentage threshold is between 20% and 90%. For example, the percentage threshold is between 30% and 80%. For example, the percentage threshold is between 40% and 70%. For example, the percentage threshold is between 50% and 60%.

In an embodiment, step 320 comprises steps 322, 324, and 326. Step 322 comprises identifying a response time for responding to the requests. Step 324 comprises assessing the identified response time against a predetermined response time. Step 326 comprises, in response to the identified response time being greater than or equal to the predetermined response time, delaying processing of the requests from the client by the predetermined delay time.

In an embodiment, step 320 comprises delaying processing of the requests from the client by a predetermined delay time and by a predetermined number of requests that result in a non-failure response, wherein the requests that result in a non-failure response comprise requests that do not have a predefined error condition. In an example, the response time is validated by the request monitor controller before injecting an artificial delay (i.e. a predetermined delay time) to ensure that any failing responses that already have a long response time are not further delayed.

Figure 4:
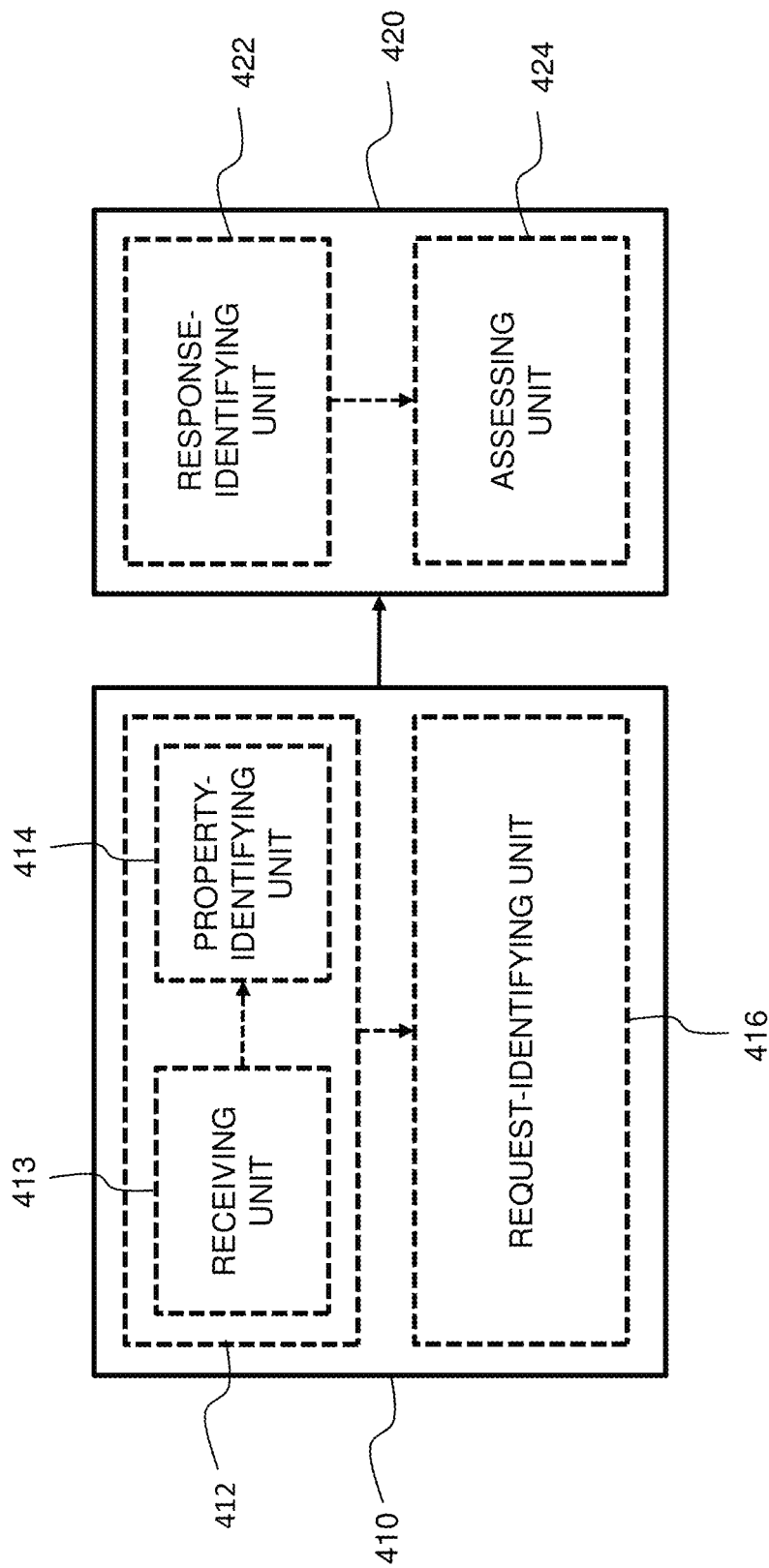
FIG. 4 is a simplified block diagram of an exemplary embodiment of a system for controlling a server response latency.

Referring now to FIG. 4, there is depicted a simplified block diagram of an exemplary embodiment of a system for controlling a server response latency.

The system comprises a monitoring unit 410 configured to, at a server, monitor a number of requests from a client that cause a failure response. The system further comprises a delaying unit 420 configured to, responsive to the number of requests meeting a predetermined requirement, delay processing of the requests from the client by a predetermined delay time.

In an embodiment, the monitoring unit 410 comprises a processing unit 412 configured to process the requests received from the client. The monitoring unit 410 further comprises a request-identifying unit 416 configured to identify a number of the processed requests that result in a failure response.

In an embodiment, the requests from the client that cause a failure response comprise requests from the client that have a predefined error condition.

In an embodiment, the predefined error condition comprises at least one of a status code indicating a client error and a status code indicating a server error.

In an embodiment, the processing unit 412 comprises a receiving unit 413 configured to receive the requests from the client. The processing unit 412 further comprises a property-identifying unit 414 configured to identify a property dataset associated with each of the requests and identify at least one of the client and a destination associated with the requests based on the identified property dataset.

In an embodiment, the property dataset comprises at least one of an origin network address, a destination network address, a network cookie, a network header, and a host or network interface identifier.

In an embodiment, the delaying unit 420 is further configured to, in response to the number of requests being greater than or equal to a predetermined threshold, delay processing of the requests from the client by the predetermined delay time.

In an embodiment, the delaying unit 420 is further configured to delay processing of the requests from the client by a predetermined delay time and by a predetermined number of requests that result in a non-failure response. The requests that result in a non-failure response comprise requests that do not have a predefined error condition.

In an embodiment, the delaying unit 420 comprises a response-identifying unit 422 configured to identify a response time for responding to the requests. The delaying unit 420 further comprises an assessing unit 424 configured to assess the identified response time against a predetermined response time. The delaying unit 420 is further configured to, in response to the identified response time being greater than or equal to the predetermined response time, delay processing of the requests from the client by the predetermined delay time.

Figure 5:
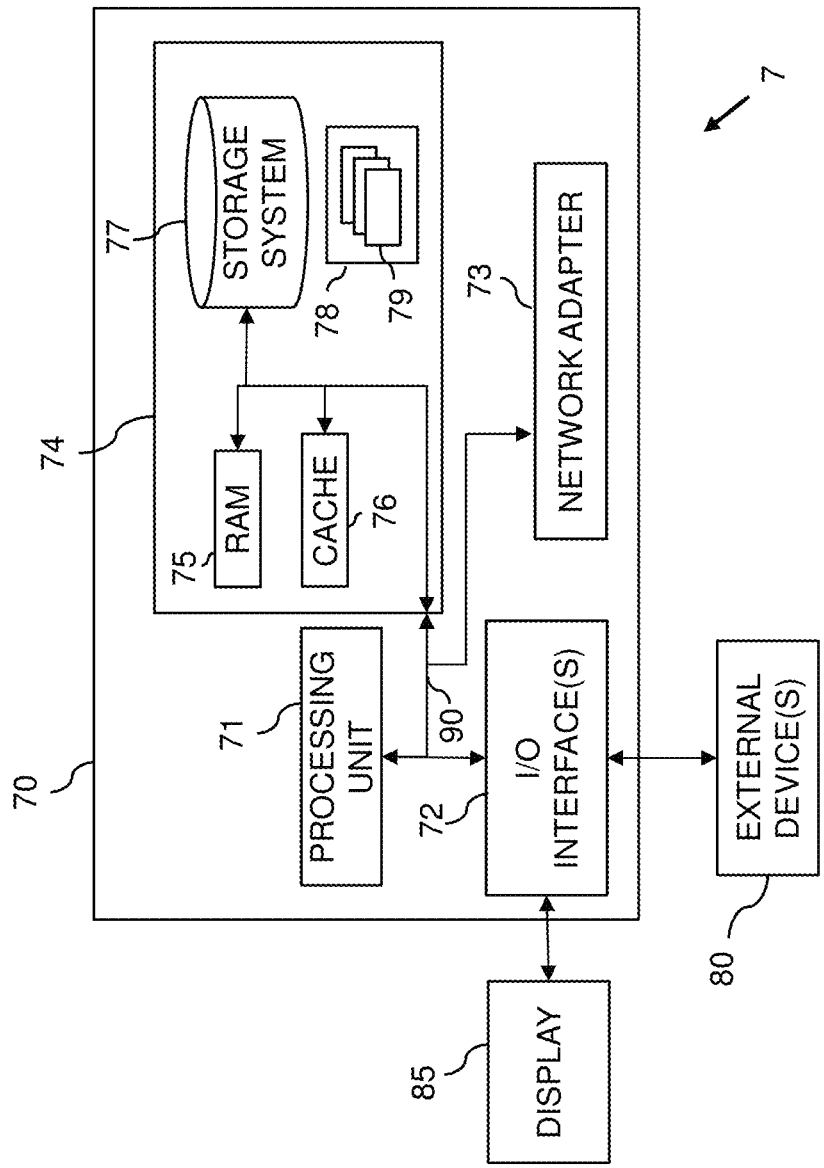
FIG. 5 is a block diagram of an example system in which aspects of the illustrative embodiments may be implemented.

By way of further example, as illustrated in FIG. 5, embodiments may comprise a computer system 70, which may form part of a networked system 7. For instance, an identifying unit may be implemented by the computer system 70. The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the system to perform a method for controlling a server response latency.

Program/utility 78, having a set (at least one) of program modules 79, may be stored in storage system 77 and subsequently loaded into memory 74. Program modules 79 generally carry out the functions and/or methodologies of proposed embodiments for controlling a server response latency.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate recreated content to a system or user).

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for controlling a server response latency, the method comprising:
    monitoring, at a server, requests from a client, wherein the monitoring comprises identifying a number of the requests that result in a failure response;
    for each failure response, incrementing a failed response count for a point of origin of the request in a property dataset associated with the request;
    and
    responsive to the failed response count meeting or exceeding a predetermined requirement, delaying processing of the request from the client by a predetermined delay time, wherein the predetermined delay time controls the latency at the server, and upon elapse of the predetermined delay time, decrementing the failed request count.

2. The method of claim 1, wherein, responsive to the number of requests meeting a predetermined requirement, delaying processing of the requests from the client by a predetermined delay time comprises:
    in response to the number of requests being greater than or equal to a predetermined threshold, delaying processing of the requests from the client by the predetermined delay time.

3. The method of claim 1, wherein the property dataset comprises at least one of:
    an origin network address;
    a destination network address;
    a network cookie;
    a network header; and
    a host or network interface identifier.

4. The method of claim 1, wherein requests from the client that cause a failure response comprise requests from the client that have a predefined error condition.

5. The method of claim 4, wherein the predefined error condition comprises at least one of:
    a status code indicating a client error; and
    a status code indicating a server error.

6. The method of claim 1, wherein delaying processing of the requests from the client by a predetermined delay time comprises:
    delaying processing of the requests from the client by a predetermined delay time and by a predetermined number of requests that result in a non-failure response;
    wherein the requests that result in a non-failure response comprise requests that do not have a predefined error condition.

7. The method of claim 1, wherein delaying processing of the requests from the client by a predetermined delay time comprises:
    identifying a response time for responding to the requests;
    assessing the identified response time against a predetermined response time; and
    in response to the identified response time being greater than or equal to the predetermined response time, delaying processing of the requests from the client by the predetermined delay time.

8. A computer program product for controlling a server response latency, the computer program product comprising a computer readable storage medium having program instructions embodied therewith, the program instructions executable by a processing unit to cause the processing unit to perform a method comprising:
    monitoring, at a server, requests from a client, wherein the monitoring comprises identifying a number of the requests that result in a failure response;
    for each failure response, incrementing a failed response count for a point of origin of the request in a property dataset associated with the request;
    and
    responsive to the failed response count meeting or exceeding a predetermined requirement, delaying processing of the request from the client by a predetermined delay time, wherein the predetermined delay time controls the latency at the server, and upon elapse of the predetermined delay time, decrementing the failed request count.

9. The computer program product of claim 8, wherein, responsive to the number of requests meeting a predetermined requirement, delaying processing of the requests from the client by a predetermined delay time comprises:
    in response to the number of requests being greater than or equal to a predetermined threshold, delaying processing of the requests from the client by the predetermined delay time.

10. A system for controlling a server response latency, the system comprising one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the system performs a method comprising:
    monitoring, at a server, requests from a client, wherein the monitoring comprises identifying a number of the requests that result in a failure response;
    for each failure response, incrementing a failed response count for a point of origin of the request in a property dataset associated with the request; 61
    and
    delaying, responsive to the failed response count meeting or exceeding a predetermined requirement, delay processing of the request from the client by a predetermined delay time, wherein the predetermined delay time controls the latency at the server, and upon elapse of the predetermined delay time, decrementing the failed request count.

11. The system of claim 10, further comprising:
in response to the number of requests being greater than or equal to a predetermined threshold, delay processing of the requests from the client by the predetermined delay time.

12. The system of claim 10, further comprising:
receiving the requests from the client;
identifying a property dataset associated with each of the requests; and
identifying at least one of the client and a destination associated with the requests based on the identified property dataset.

13. The system of claim 12, wherein the property dataset comprises at least one of:
an origin network address;
a destination network address;
a network cookie;
a network header; and
a host or network interface identifier.

14. The system of claim 10, wherein requests from the client that cause a failure response comprise requests from the client that have a predefined error condition.

15. The system of claim 14, wherein the predefined error condition comprises at least one of:
a status code indicating a client error; and
a status code indicating a server error.

16. The system of claim 10, wherein the delaying further comprises:
delaying processing of the requests from the client by a predetermined delay time and by a predetermined number of requests that result in a non-failure response;
wherein the requests that result in a non-failure response comprise requests that do not have a predefined error condition;
identifying a response time for responding to the requests; and
assessing the identified response time against a predetermined response time; wherein
the delaying unit is further configured to, in response to the identified response time being greater than or equal to the predetermined response time, delay processing of the requests from the client by the predetermined delay time, wherein the predetermined delay time controls the latency of the server.

* * * * *